United States Patent
Osajima et al.

(10) Patent No.: US 12,139,197 B1
(45) Date of Patent: Nov. 12, 2024

(54) STEERING CONTROL METHOD AND STEERING DEVICE

(71) Applicants: Nissan Motor Co., Ltd., Yokohama (JP); JTEKT CORPORATION, Kariya (JP)

(72) Inventors: Shintaro Osajima, Kanagawa (JP); Daisuke Hiramatsu, Kanagawa (JP); Genpei Nakasone, Nisshin (JP); Satoshi Anzai, Nara (JP); Tomohisa Ueki, Nara (JP); Yuji Sasai, Okazaki (JP)

(73) Assignees: Nissan Motor Co., Ltd., Yokohama (JP); JTEKT CORPORATION, Kariya (JP)

( * ) Notice: Subject to any disclaimer, the term of this patent is extended or adjusted under 35 U.S.C. 154(b) by 0 days.

(21) Appl. No.: 18/691,478

(22) PCT Filed: Jul. 22, 2022

(86) PCT No.: PCT/JP2022/028497
§ 371 (c)(1),
(2) Date: Mar. 13, 2024

(87) PCT Pub. No.: WO2023/062907
PCT Pub. Date: Apr. 20, 2023

(30) Foreign Application Priority Data

Oct. 12, 2021 (JP) .................................. 2021-167227

(51) Int. Cl.
*B62D 15/02* (2006.01)
*B62D 5/04* (2006.01)
*B62D 6/00* (2006.01)

(52) U.S. Cl.
CPC ....... *B62D 15/0265* (2013.01); *B62D 5/0463* (2013.01); *B62D 6/002* (2013.01)

(58) Field of Classification Search
CPC .................................................. B60R 16/027
See application file for complete search history.

(56) References Cited

U.S. PATENT DOCUMENTS

2022/0135117 A1* 5/2022 Tsubaki ................. B62D 6/002
180/402

FOREIGN PATENT DOCUMENTS

| CN | 109572803 A | 4/2019 |
| CN | 110382332 A | 10/2019 |

(Continued)

OTHER PUBLICATIONS

Chinese Office Action of Sep. 13, 2024 of corresponding Chinese Patent Application No. 202280068697.9.

*Primary Examiner* — Jaime Figueroa
*Assistant Examiner* — Jerrod Irvin Davis
(74) *Attorney, Agent, or Firm* — Global IP Counselors, LLP

(57) ABSTRACT

A steering control method includes detecting a current state of a vehicle, setting a target state of the vehicle, setting a basic steering command value based on a difference between the current state and the target state, calculating a first steering command value and a second steering command value by distributing the basic steering command value between the first steering command value and the second steering command value in a prescribed ratio, driving a first steering motor of a steering mechanism based on the first steering command value, and driving a second steering motor of the steering mechanism based on the second steering command value.

9 Claims, 6 Drawing Sheets

(56) References Cited

FOREIGN PATENT DOCUMENTS

| | | |
|---|---|---|
| JP | 2015-39256 A | 2/2015 |
| JP | 2015-163498 A1 | 9/2015 |
| JP | 2017-177943 A | 10/2017 |
| JP | 2018-130007 A | 8/2018 |
| JP | 2020-92583 A | 6/2020 |
| WO | 2015/141795 A1 | 9/2015 |
| WO | 2018/051838 A1 | 3/2018 |
| WO | 2018/088465 A | 5/2018 |
| WO | 2020/105620 A1 | 5/2020 |
| WO | 2020/230307 A1 | 11/2020 |

* cited by examiner

STEERING CONTROL METHOD AND STEERING DEVICE

CROSS-REFERENCE TO RELATED APPLICATIONS

This application is a U.S. national stage application of International Application No. PCT/JP2022/028497, filed on Jul. 22, 2022. This application also claims priority to Japanese Patent Application No 2021-167227, filed on Oct. 12, 2021.

BACKGROUND

Technical Field

The present invention relates to a steering control method and a steering device.

Background Information

Japanese Laid-Open Patent Application No. 2017-177943 Patent Document 1 cited below describes a steering system that calculates a steering angle command value by multiplying the difference between a target steering angle and an actual steering angle by a prescribed gain and drives a steering motor based on the steering angle command value.

SUMMARY

However, when the steering command value is generated in response to the difference between a target state, which is the target state of the vehicle, and a current state, which is the actual current state of the vehicle, and a steering motor is driven with the generated command value, a transient response of the steering command value to changes in the target state or current state may produce oscillations in the steering motor. The purpose of the present invention is to suppress the oscillations produced in the steering motor when the steering command value is generated in response to the difference between the target state, which is the target state of the vehicle, and the current state, which is the actual current state of the vehicle, and the steering motor is driven with the generated steering command value.

In the steering control method of one aspect of the present invention, a current state, which is the current state of the vehicle, is detected, a target state, which is the target state of the vehicle, is set, a first steering command value and a second steering command value, which are provided with a relative time difference, are calculated as steering command values for driving a steering mechanism that steers the steered wheels of the vehicle based on the difference between the current vehicle state and the target vehicle state, a first steering motor for driving the steering mechanism is driven based on the first steering command value, and a second steering motor for driving the steering mechanism is driven based on the second steering command value.

According to the present invention, the oscillations produced in a steering motor can be suppressed when a steering command value is generated in response to the difference between a target state, which is the target state of the vehicle, and a current state, which is the actual current state of the vehicle, and the steering motor is driven with the generated steering command value. The purposes and advantages of the present invention may be realized and attained by means of the elements and combinations indicated in the claims. It is understood that both the foregoing general description and the following detailed description are merely illustrative and explanatory and do not limit the present invention as defined in the claims.

BRIEF DESCRIPTION OF THE DRAWINGS

Referring now to the attached drawings which form a part of this original disclosure.

DETAILED DESCRIPTION

An example in which the steering device of the present invention is applied to an electric power steering system will be described below; however, the present invention is not limited to such electric power steering systems. The present invention finds wide application to steering devices that generate a steering command value in response to the difference between the target state, which is the target state of the vehicle, and the current state, which is the actual current state of the vehicle, and drive the steering motor with the generated steering command value. For example, the steering device of the present invention may be applied to a steer-by-wire system in which the steering wheel and the steered wheels can be mechanically separated.

Figure 1:
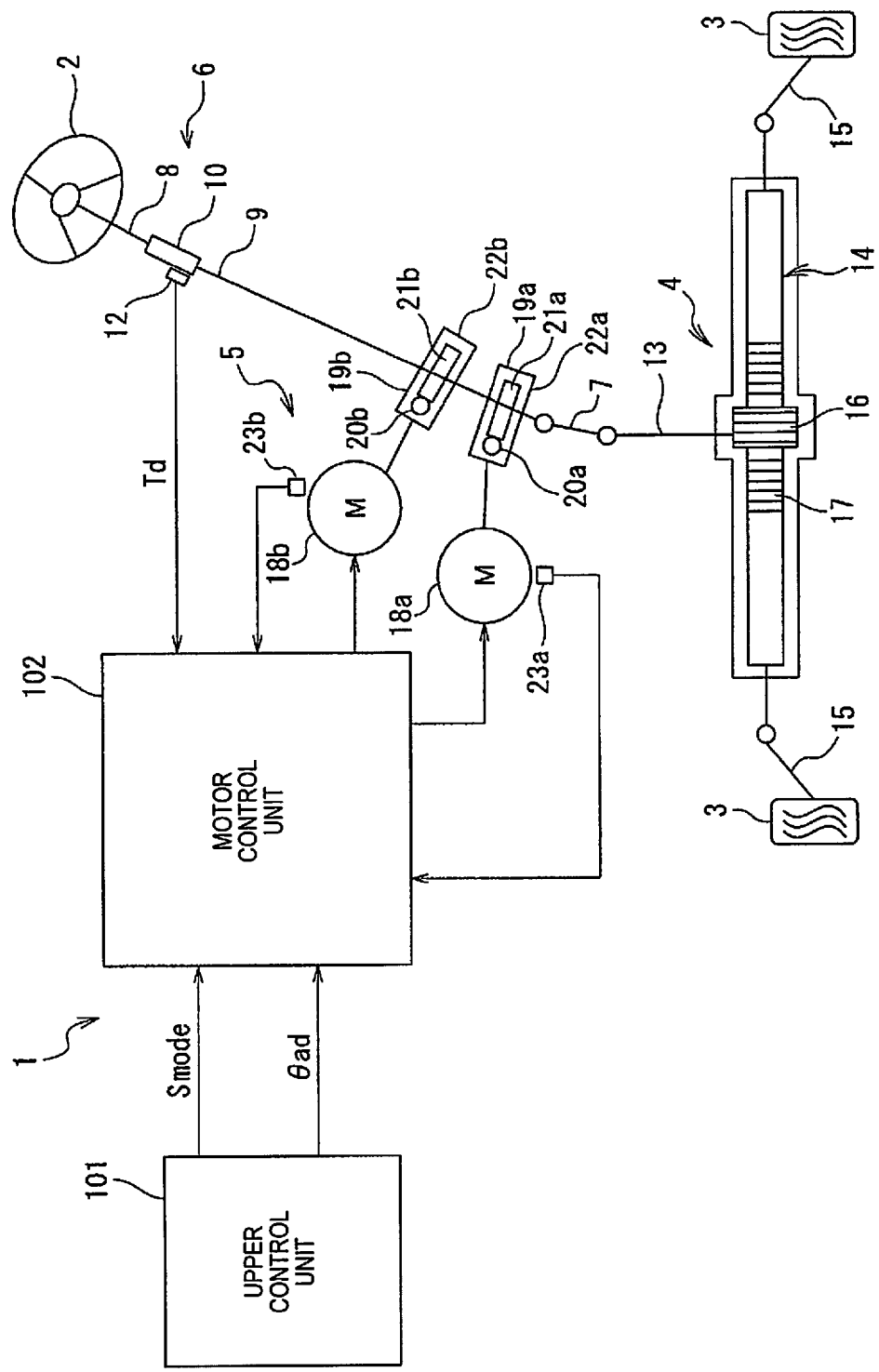
FIG. 1 shows a schematized diagram of one example of a steering device according to a first embodiment.

FIG. 1 shows a schematized diagram of one example of the configuration of an electric power steering system 1 to which the steering device of a first embodiment has been applied. In the electric power steering system 1, an upper-level control unit 101 sets a control mode of the electric power steering system 1. The upper-level control unit 101 outputs a control mode signal S mode that indicates the control mode. The control mode of the electric power steering system 1 includes a normal control mode in which an electric motor 18a and an electric motor 18b generate a steering assist force in response to steering torque Td that is applied to a steering shaft 6 such that the steering assist force is applied thereto.

For example, the control mode of the electric power steering system 1 may include any one of automatic driving control to make a host vehicle travel autonomously based on the surroundings of the host vehicle and the travel conditions of the vehicle, automatic parking control that causes the vehicle to move from a current position to a target parking position, emergency avoidance control for the avoidance of obstacles in the direction of travel, and lane departure prevention control (lane keeping control) for preventing the host vehicle from deviating from the travel lane. When the control mode is automatic driving control, automatic parking control, emergency avoidance control, or lane departure prevention control, the upper-level control unit 101 calculates a target steering angle θad, which is the target value of the steering angle of the steered wheels 3.

For example, in automatic travel control, the upper-level control unit 101 sets a target travel trajectory as the path over which the host vehicle is made to travel based on the surroundings of the host vehicle and the travel conditions of the host vehicle, and calculates the steering angle at which the host vehicle is made to travel along the target travel trajectory as target steering angle θad. Specifically, for example, the system detects the lane markings ahead of the vehicle on the left and right sides of the road, computes a target travel trajectory that passes through a predetermined position in the lane width direction relative to the detected lane markings, and calculates the steering angle at which the host vehicle is made to travel along the calculated target trajectory as target steering angle θad. For example, in automatic parking control, the upper-level control unit 101 sets a target trajectory for moving the host vehicle to the target parking position based on the relative positional relationship between a current position of the host vehicle and a target parking position, and calculates the steering angle at which the host vehicle is made to travel along the target trajectory as target steering angle θad. For example, in emergency avoidance control, the upper-level control unit 101 calculates the steering angle for avoiding obstacles in the direction of travel of the vehicle as target steering angle θad. For example, in lane departure prevention control, the upper-level control unit 101 calculates the steering angle for preventing the vehicle from deviating from the travel lane as target steering angle θad. The control mode of the upper-level control unit 101 may be selected by the driver by using a selection switch, etc., not shown, that is connected to the upper-level control unit 101. Alternatively, in the case that the vehicle is equipped with a sensor that detects the distance to obstacles ahead of the vehicle, the control mode may be selected automatically depending on the vehicle situation, such as a change from the automatic travel control to the emergency avoidance control when an obstacle is detected within a predetermined distance in the direction of travel of the vehicle during automatic travel control, etc. In addition, the above-mentioned control mode may be selected automatically in accordance with the location and situation of the vehicle, such as an automatic initiation of automatic parking control when the vehicle is located in a parking lot, the vehicle speed is less than or equal to a prescribed speed suitable for parking, etc. In this manner, the method for selecting the control mode in the upper-level control unit 101 can be changed as deemed appropriate.

Target steering angle θad and control mode signal S mode generated by the upper-level control unit 101 are supplied to the motor control unit 102 via an in-vehicle network, for example.

The steering shaft 6 includes an input shaft 8 connected to a steering wheel 2 and an output shaft 9 connected to an intermediate shaft 7. The input shaft 8 and the output shaft 9 are connected via a torsion bar 10 to rotate relative to one another. A torque sensor 12 is disposed near the torsion bar 10. The torque sensor 12 detects the steering torque (actual steering torque) Td applied to the steering wheel 2 as the current state, which is the current state of the host vehicle, based on the amount of relative rotational displacement between the input shaft 8 and output shaft 9 (i.e., the amount of torsion of the torsion bar). The actual steering torque Td is one example of the "current steering torque" described in the claims. In the present embodiment, the actual steering torque Td is, for example, the torque for steering to the left, which is detected as a positive value, and the torque for steering to the right, which is detected as a negative value, where it is assumed that the larger the absolute value, the greater the magnitude of the actual steering torque Td.

The steering mechanism 4 includes a rack-and-pinion mechanism that includes a pinion shaft 13 and a rack shaft 14 as the steering axis. A steered wheel 3 is connected to each end of the rack shaft 14 via a tie rod 15 and a knuckle arm (not shown in the figures). The pinion shaft 13 is connected to the intermediate shaft 7. The pinion shaft 13 is adapted to rotate in conjunction with the steering of the steering wheel 2. A pinion 16 is connected to the end of the pinion shaft 13.

The rack shaft 14 extends linearly in the lateral direction of the vehicle. A rack 17 that is engaged by the pinion 16 is formed in the axially intermediate portion of the rack shaft 14. The rack 17 and pinion 16 convert the rotary motion of the pinion shaft 13 into an axial linear motion of the rack shaft 14. The steered wheels 3 can be steered by means of this axial movement of the rack shaft 14. When the steering wheel 2 is steered (rotated), the rotation is transmitted to the pinion shaft 13 via the steering shaft 6 and the intermediate shaft 7. The rotation of the pinion shaft 13 is then converted into the axial movement of the rack shaft 14 by the rack 17 and the pinion. In this way, the steered wheels 3 are steered.

The steering assist mechanism 5 comprises a first electric motor 18a and a second electric motor 18b for generating a steering assist force (assist torque), and a first reduction gear 19a and a second reduction gear 19b for amplifying the output torques of the first electric motor 18a and the second electric motor 18b, respectively, and transmitting the output torques to the steering mechanism 4.

The first reduction 19a has a worm gear mechanism that comprises a worm gear 20a and a worm wheel 21a that engages with the worm gear 20a. The first reduction gear 19a is housed in a gear housing 22a that serves as the transmission mechanism housing. The reduction ratio (gear ratio) of the first reduction gear 19a is represented by N below. The reduction ratio N is defined as ωwg/ωww, that is, the ratio of the angular speed ωwg of the worm gear 20a to the angular speed ωww of the worm wheel 21a. The second reduction gear 19b is configured in the same way as the first reduction gear 19a, and has a worm gear mechanism that comprises a worm gear 20b and a worm wheel 21b that engages with the worm gear 20b in a gear housing 22b.

The worm gear 20a of the first reduction gear 19a is rotationally driven by the first electric motor 18a. Further, the worm wheel 21a is connected to the output shaft 9 so as to rotate integrally therewith. When the worm gear 20a is rotationally driven by the first electric motor 18a, the worm wheel 21a is rotationally driven. Thus, the motor torque of the first electric motor 18a is applied to the steering shaft 6 and rotates the steering shaft 6 (output shaft 9). The worm gear 20b of the second reduction gear 19b, on the other hand, is rotationally driven by the second electric motor 18b. Further, the worm wheel 21b is connected to the output shaft 9 so as to rotate integrally therewith. When the worm gear 20b is rotationally driven by the second electric motor 18b, the worm wheel 21b is rotationally driven. Thus, the motor torque of the second electric motor 18b is applied to the steering shaft 6 and rotates the steering shaft 6 (output shaft 9).

The rotation of the steering shaft 6 is transmitted to the pinion shaft 13 via the intermediate shaft 7. The rotary motion of the pinion shaft 13 is converted into the axial linear motion of the rack shaft 14. The steered wheels 3 can thereby be steered by means of the motor torques of the first electric motor 18a and the second electric motor 18b. The steering wheel 2 also rotates in conjunction with the rotation of the steering shaft 6. As described above, the steering mechanism 4 for steering the steered wheels 3 is driven by the motor torques of the first electric motor 18a and the second electric motor 18b, so that the steered wheels 3 can be steered.

It should be noted that the configurations of the first electric motor 18a and the second electric motor 18b shown in FIG. 1 are examples, and the present invention is not limited to such examples. For example, the first electric motor 18a and the second electric motor 18b may be double-wound motors in which two sets of windings are wound in the same motor housing to rotate a common rotor. In this case, a single reduction gear is arranged as the first reduction gear 19a and the second reduction gear 19b. Although FIG. 1 shows a column-assist type electric power steering system in which an electric motor is connected to a steering shaft, the present invention is not limited to a column-assist type electric power steering system. The present invention can also be applied to a single pinion-assist type electric power steering system and a dual pinion-assist type electric power steering system in which the electric motor is connected to the pinion shaft, and to a rack-assist type electric power steering system in which the electric motor is arranged in a rack. In the case of the dual pinion-assist type system, a second pinion that engages with the rack 17 may be added, and one of either the first electric motor 18a or the second electric motor 18b may be connected to the pinion 16 and the other may be connected to the second pinion.

The first electric motor 18a and the second electric motor 18b are equipped with rotation angle sensors 23a and 23b, respectively, for detecting the angles of rotation of the rotors of the first electric motor 18a and the second electric motor 18b. The actual steering torque Td detected by the torque sensor 12 and the output signals of the rotation angle sensors 23a and 23b are input to the motor control unit 102. The motor control unit 102 controls the first electric motor 18a and the second electric motor 18b based on the above-mentioned input signals and the information provided from the upper-level control unit 101 on the vehicle side.

More specifically, the motor control unit 102 computes the current actual steering angle of the steered wheels 3 (hereinafter referred to as the "actual steering angle") based on the output signals of the rotation angle sensors 23a and 23b as the current state, which is the current state of the host vehicle. The actual steering angle is an example of the "current steering angle" described in the claims. The motor control unit 102 also obtains the actual steering torque Td detected by the torque sensor 12 as the current state. Further, the motor control unit 102 obtains the target steering angle θad from the upper-level control unit 101 as the target state, which is the target value of the state of the vehicle. The motor control unit also sets the target steering torque, which is the target value of steering torque. It should be noted that since the first electric motor 18a and the second electric motor 18b are mechanically connected via the first reduction gear 19a, the output shaft 9, and the second reduction gear 19b, the steering angles detected by the motor control unit 102 based on the output signals of the rotation angle sensor 23a and rotation angle sensor 23b have essentially the same value. Thus, either the rotation angle sensor 23a or the rotation angle sensor 23b may be omitted, and only the other need be configured.

Based on the difference between the current state and the target state, the motor control unit 102 distributes the entire generated torque, which is required to drive the steering mechanism that steers the steered wheels 3, between the first electric motor 18a and the second electric motor 18b. The motor control unit 102 may also set a first steering command value i1 and a second steering command value i2 for the generation of torque to the first electric motor 18a and the second electric motor 18b using at least one of proportional control (P control), integral control (I control), and differential control (D control) of the difference between the current state and the target state. It should be noted that the ratio of distributing the entire torque required to drive the steering mechanism between first steering command value i1 and second steering command value i2 may be, for example 50:50 (that is, the magnitude of first steering command value i1 to that of the second steering command value i2 may be made equal), or one of the two may be made larger than the other. The motor control unit 102 drives the first electric motor 18a based on first steering command value i1 and drives the second electric motor 18b based on second steering command value i2.

Here, there is a possibility that oscillations may be produced in the first electric motor 18a and the second electric motor 18b when the target state or the current state changes. For example, if the above-mentioned P control, I control, and D control have high gain values, first steering command value i1 and second steering command value i2 will increase when the target state or current state changes, so that oscillations may occur in the transient response of first steering command value i1 and second steering command value i2, thereby producing oscillations in the first electric motor 18a and the second electric motor 18b. However, setting a small gain in order to suppress such oscillations deteriorates the ability to track the current state with respect to the target state. Further, irrespective of the magnitude of the gain, a large change in the target state or the current state may cause the above-mentioned oscillation to occur.

Therefore, the motor control unit 102 of the present invention provides a time difference between first steering command value i1 and second steering command value i2. In other words, the motor control unit 102 generates first steering command value i1 and second steering command value i2 with a time difference between the two values. For example, either first steering command value i1 or second steering command value i2 is output with a delay with respect to the other. In this way, when a time difference is provided between first steering command value i1 and second steering command value i2, it is possible to delay the generation of part of the torque compared to the case in which no time difference is provided (that is, compared to the case in which the entire torque for driving the steering mechanism is generated at the same time in response to changes in the difference between the current state and the target state). As a result, it is possible to reproduce a phenomenon similar to the delay caused by viscous drag, so that the oscillation generated by the transient response of first steering command value i1 and second steering command value i2 can be attenuated by the viscous drag.

Thus, it is possible to converge the oscillations of first steering command value i1 and second steering command value i2 quickly in order to suppress the oscillations produced in the first electric motor 18a and the second electric motor 18b.

Figure 2:
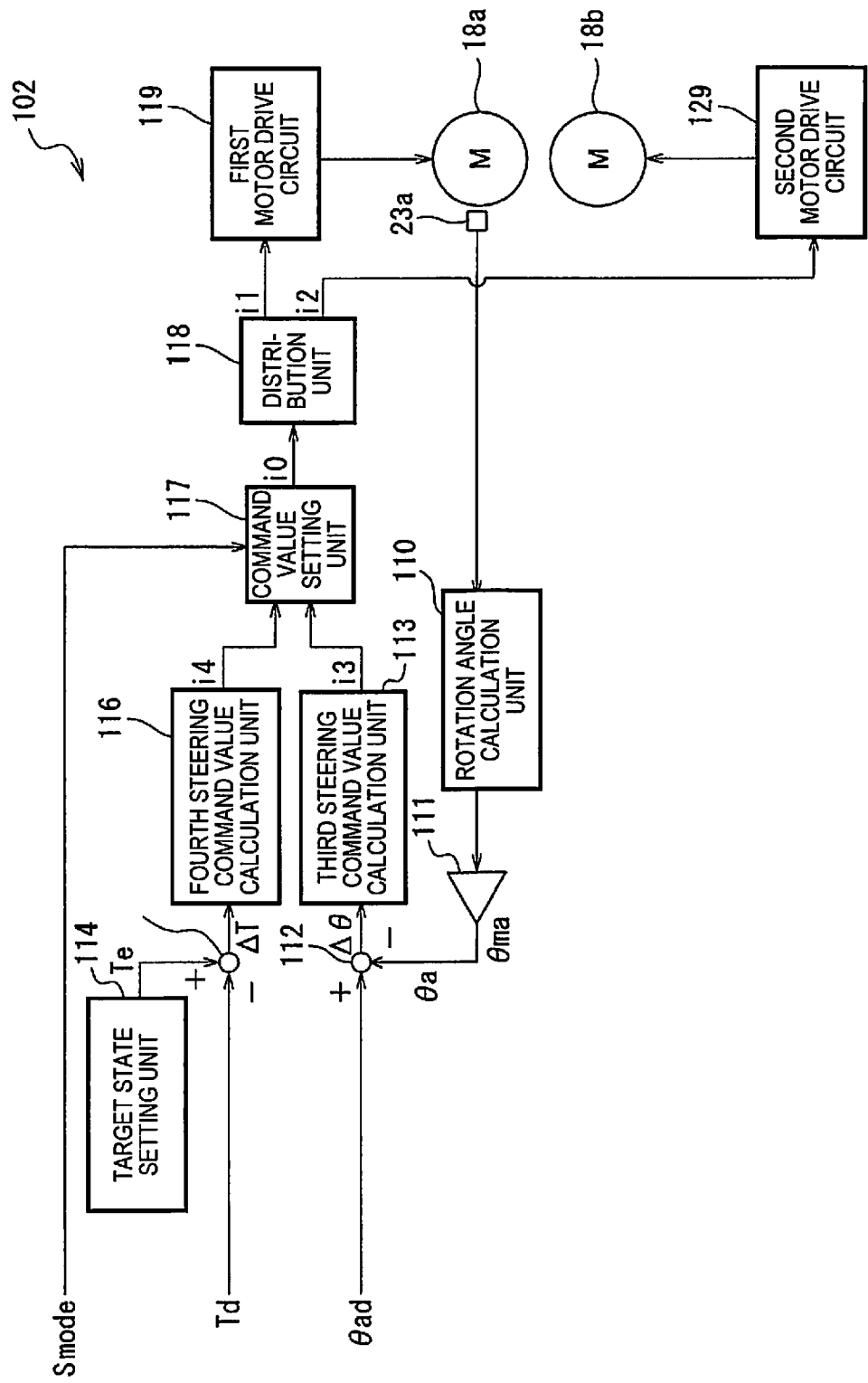
FIG. 2 shows a block diagram of one example of the functional configuration of a motor control unit according to the first embodiment.

The motor control unit 102 will now be explained in detail. FIG. 2 shows a block diagram of one example of the functional configuration of the motor control unit 102 according to the first embodiment. It should be noted that, as described above, the steering angles detected by the motor control unit 102 based on the output signals of the rotation angle sensor 23a and the rotation angle sensor 23b are essentially the same, so that in the block diagram in FIG. 2, only the rotation angle sensor 23a is used.

A rotation angle calculation unit 110 calculates rotor rotation angle θma of the first electric motor 18a based on a signal output from the rotation angle sensor 23a. A reduction ratio division unit 111 converts rotor rotation angle θma into rotation angle (actual steering angle) θa of the output shaft 9 by dividing rotor rotation angle θma, which is calculated by the rotation angle calculation unit 110, by reduction ratio N. The actual steering angle θa calculated by the reduction ratio division unit 111 is input to a subtractor 112.

The subtractor 112 calculates the deviation (steering angle deviation) Δθ=(θad−θa) of the actual steering angle θa from the target steering angle θad provided by the upper-level control unit 101 and outputs this value to a third steering command value calculation unit 113.

The third steering command value calculation unit 113 calculates a third steering command value i3 as a steering command value for driving the steering mechanism 4 using at least one of P control, I control, and D control relative to steering angle deviation Δθ. The third steering command value calculation unit 113 outputs the third steering command value i3 to a command value setting unit 117.

A target state setting unit 114, on the other hand, sets target steering torque Te. For example, the target state setting unit 114 may set target steering torque Te in response to the lateral acceleration generated in the host vehicle. For example, the target state setting unit 114 may set target steering torque Te to a larger value as the lateral acceleration becomes greater, such that the greater the lateral acceleration, the greater the steering torque required for steering.

The subtractor 115 calculates the deviation (steering torque deviation) ΔT=(Te−Td) of the actual steering torque Td from the target steering torque Te set by the target state setting unit 114 and outputs this value to a fourth steering command value calculation unit 116.

The fourth steering command value calculation unit 116 calculates a fourth steering command value i4 using at least one of P control, I control, and D control relative to steering torque deviation ΔT as a steering command value to drive the steering mechanism 4. The fourth steering command value calculation unit 116 outputs fourth steering command value i4 to the command value setting unit 117.

The command value setting unit 117 sets a basic steering command value i0 based on third steering command value i3 and fourth steering command value i4. Basic steering command value i0 is a steering command value that causes the electric motor to generate torque enough torque to cover the entire driving power to be applied to the steering mechanism 4.

For example, based on control mode signal S mode, the command value setting unit 117 may set basic steering command value i0 to either third steering command value i3 or fourth steering command value i4. For example, when the control mode indicated by control mode signal S mode is any one of the above-mentioned automatic travel control, automatic parking control, emergency avoidance control, or lane departure prevention control, third steering command value i3 may be set to basic steering command value i0; and when the normal control mode is used, fourth steering command value i4 may be set to basic steering command value i0.

For example, the command value setting unit 117 may set basic steering command value i0 based on the sum of third steering command value i3 and fourth steering command value i4. For example, the command value setting unit 117 may set the mean value or weighted sum of third steering command value i3 and fourth steering command value i4 to basic steering command value i0.

A distribution unit 118 distributes the basic steering command value i0 set by the command value setting unit 117 between first steering command value i1 and second steering command value i2, which are provided with a relative time difference, and outputs these values to a first motor drive circuit 119 and a second motor drive circuit 129, respectively.

For example, the distribution unit 118 calculates first steering command value i1 and second steering command value i2 by distributing basic steering command value i0 in a prescribed ratio (e.g., 50:50). Either first steering command value i1 or second steering command value i2 is then output after being delayed by a prescribed time difference D relative to the other command value.

The first motor drive circuit 119 and the second motor drive circuit 129 supply a motor drive current based on first steering command value i1 and second steering command value i2, respectively, to the first electric motor 18a and the second electric motor 18b to drive the first electric motor 18a and the second electric motor 18b, respectively. As a result, the electric power corresponding to first steering command value i1 and second steering command value i2 is respectively supplied to the first electric motor 18a and the second electric motor 18b. Therefore, the first electric motor 18a and the second electric motor 18b are driven with the torques that correspond to first steering command value i1 and second steering command value i2, respectively.

Figure 3A:
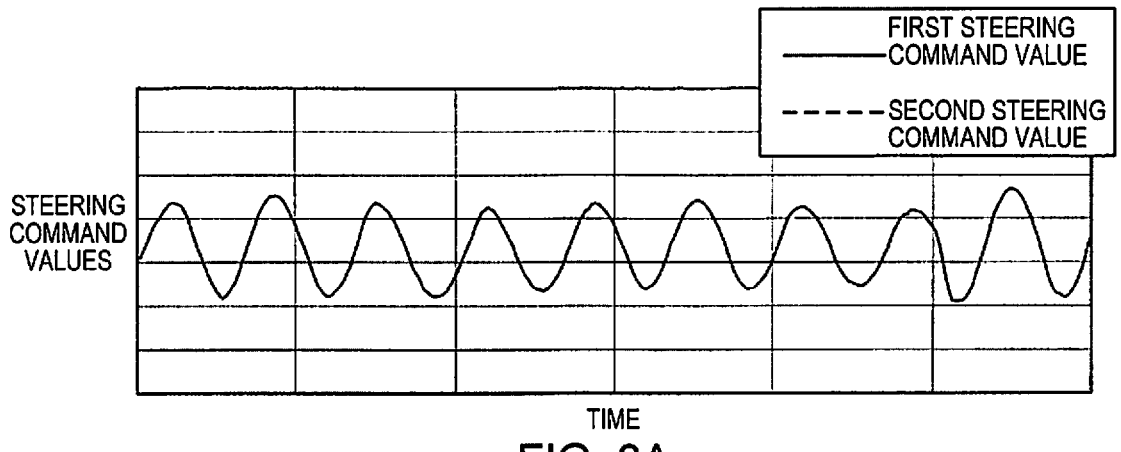
FIG. 3A shows a time diagram of one example of a first steering command value and a second steering command value without a time difference.
Figure 3B:
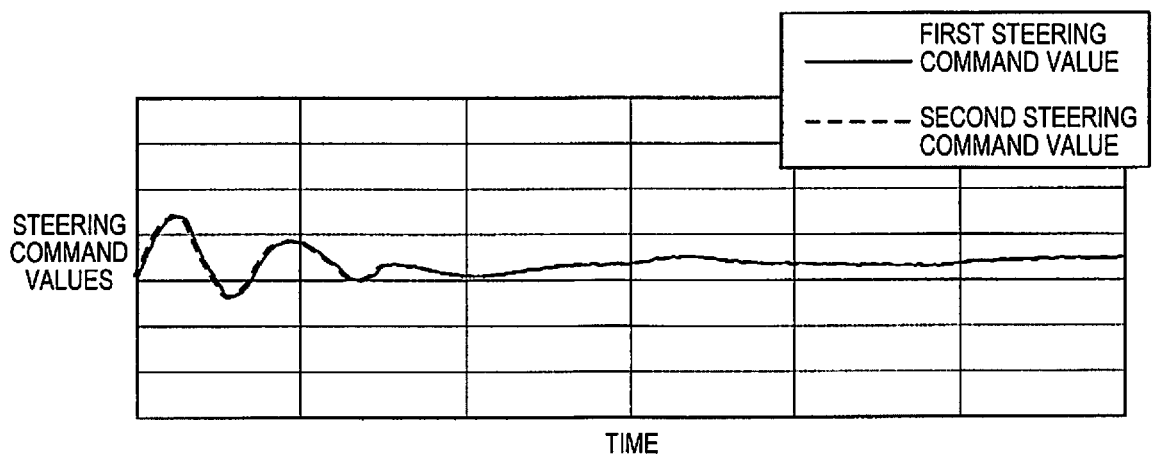
FIG. 3B shows a time chart of one example of the first steering command value and the second steering command value with a time difference.
Figure 3C:
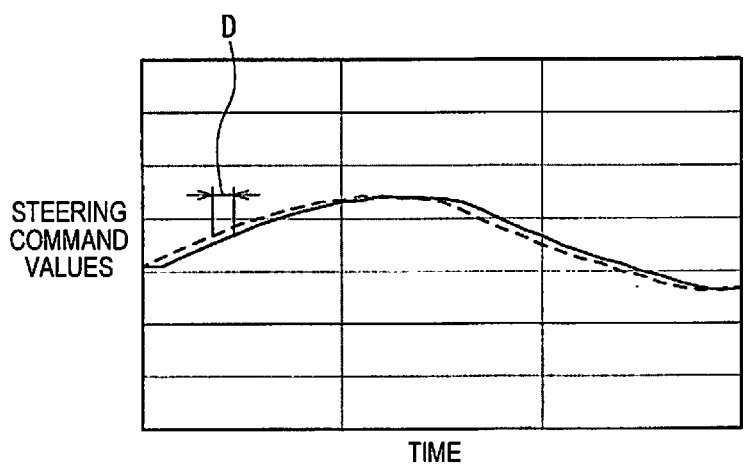
FIG. 3C shows an enlarged view of FIG. 3B.

FIG. 3A shows a time diagram of one example of first steering command value i1 and second steering command value i2 without a time difference, FIG. 3B shows a time diagram of one example of first steering command value i1 and second steering command value i2 with a time difference, and FIG. 3C shows an enlarged view of FIG. 3B. The solid line indicates first steering command value i1 and the dashed line indicates second steering command value i2.

In the examples shown in FIG. 3A to FIG. 3C, the waveforms of first steering command value i1 and second steering command value i2 are identical. In FIG. 3A, since a time difference is not provided, the waveforms exactly overlap (coincide). In FIGS. 3B and 3C, on the other hand, since a time difference is provided, second steering command value i2 lags the first steering command value i1 by time difference D.

As can be seen from FIG. 3A, time is required for the oscillations of first steering command value i1 and second steering command value i2 without a provided time difference to converge; whereas, as can be seen from FIGS. 3B and 3C, the oscillations of first steering command value i1 and second steering command value i2 with a provided time difference converge sooner.

It should be noted that the time difference between first steering command value i1 and second steering command value i2 is such that the phase difference between first steering command value i1 and second steering command value i2 is preferably greater than 0 [deg] and less than 90 [deg]. The reasons for this are as follows:

As described above, the convergence of the oscillations of first steering command value i1 and second steering command value i2 is caused by viscous drag, which is a differential term proportional to speed. Also, since the phase of the signal leads by 90 [deg] due to differentiation, if the phase of either first steering command value i1 or second steering command value i2 leads by 90 [deg] relative to the other command value, one command value is the derivative of the other. Therefore, when the phase difference between first steering command value i1 and second steering command value i2 becomes 90 [deg], the effect of viscous drag is greatest since all components of one command value leading in phase by 90 [deg] are viscous drag components.

Thus, if time difference D were increased further, the adverse effect of the control delay would increase without the viscous drag effect increasing. Therefore, the phase difference between first steering command value i1 and second steering command value i2 is preferably greater than 0 [deg] and less than 90 [deg].

Therefore, time difference D may be set to be greater than zero and less than one-fourth of the period of oscillation that may be thought to occur in a transient response to a change in first steering command value i1 and second steering command value i2. For example, the time difference may be set to be greater than zero and less than one-fourth of the period of the highest oscillation frequency that may be thought to occur in the transient response to changes in first steering command value i1 and second steering command value i2.

For example, assuming that the highest oscillation frequency that is expected to occur in a transient response to changes in first steering command value i1 and second steering command value i2 may be one of 20, 30, 50, and 100 [Hz], time difference D between first steering command value i1 and second steering command value i2 may be set to a value less than the value matching these oscillation frequencies, namely, 12.5, 8.33, 5.00, and 2.5 [msec], respectively.

Figure 4:
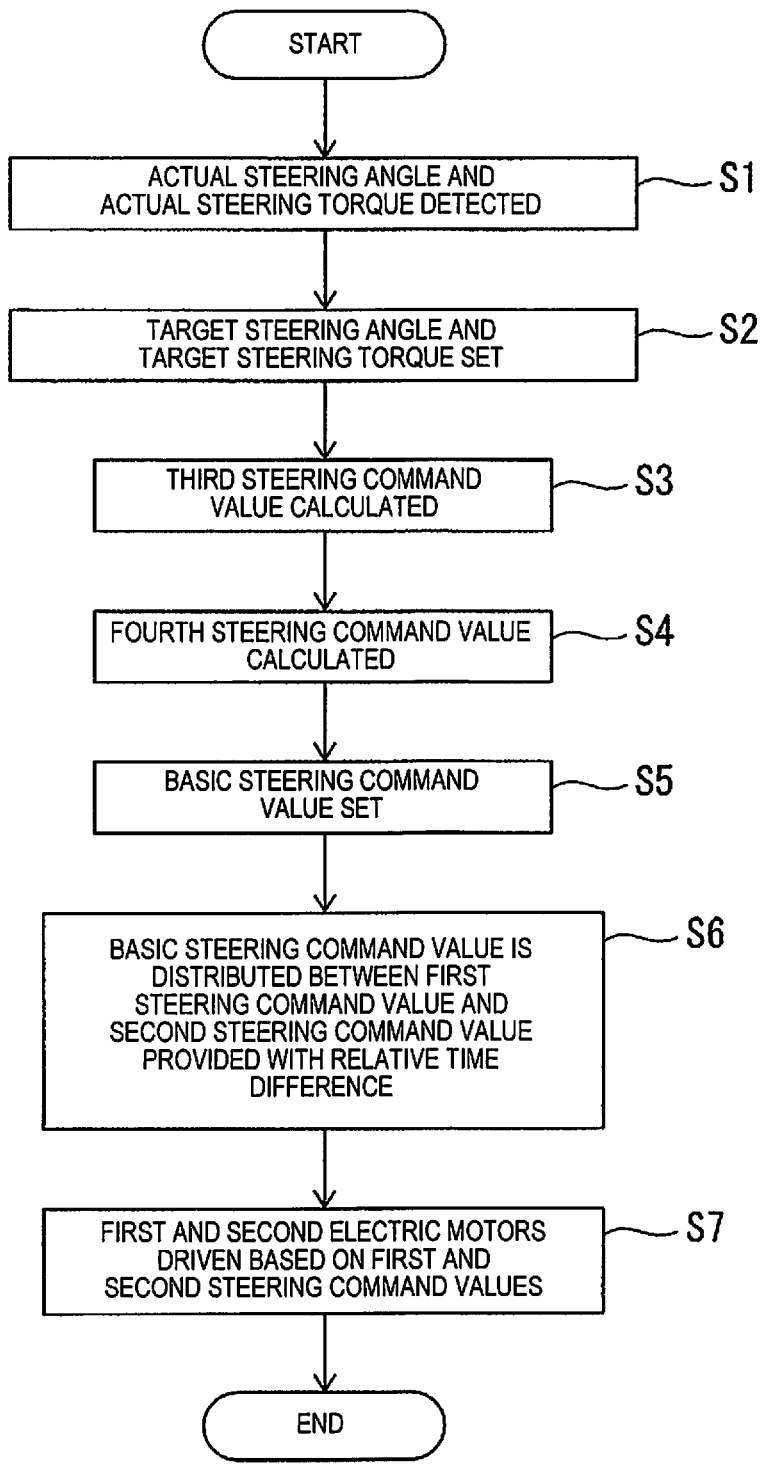
FIG. 4 shows a flowchart of one example of a steering control method according to the first embodiment.

FIG. 4 shows a flowchart of one example of the steering control method of the first embodiment.

In Step S1, the rotation angle sensor 23a, the rotation angle calculation unit 110, and the reduction ratio division unit 111 detect actual steering angle θa. Further, the torque sensor 12 detects actual steering torque Td.

In Step S2, the upper-level control unit 101 sets target steering angle θad. Further, the target state setting unit 114 sets target steering torque Te.

In Step S3, the third steering command value calculation unit 113 calculates third steering command value i3 based on steering angle deviation 40 between target steering angle θad and actual steering angle θa.

In Step S4, the fourth steering command value calculation unit 116 calculates fourth steering command value i4 based on steering torque deviation ΔT between target steering torque Te and actual steering torque Td.

In Step S5, the command value setting unit 117 sets basic steering command value i0 based on third steering command value i3 and fourth steering command value i4.

In Step S6, the distribution unit 118 distributes basic steering command i0 between first steering command value i1 and second steering command value i2, which are provided with a relative time difference.

In Step S7, the first motor drive circuit 119 and the second motor drive circuit 129 drive the first electric motor 18a and the second electric motor 18b based on first steering command value i1 and second steering command value i2, respectively.

Second Embodiment

The motor control unit 102 of the first embodiment calculates a basic steering command value i0 that causes the electric motor to generate enough torque to cover the entire driving power to be applied to the steering mechanism 4 and distributes basic steering command value i0 between first steering command value i1 and second steering command value i2, which are provided with a relative time difference.

In this second embodiment, the motor control unit 102 has a redundant configuration of two systems for calculating the steering command values, one system for calculating first steering command value i1 and one system for calculating second steering command value i2 independently, and outputs first steering command value i1 and second steering command value i2, which are provided with a relative time difference, to the first motor drive circuit 119 and the second motor drive circuit 129.

Figure 5:
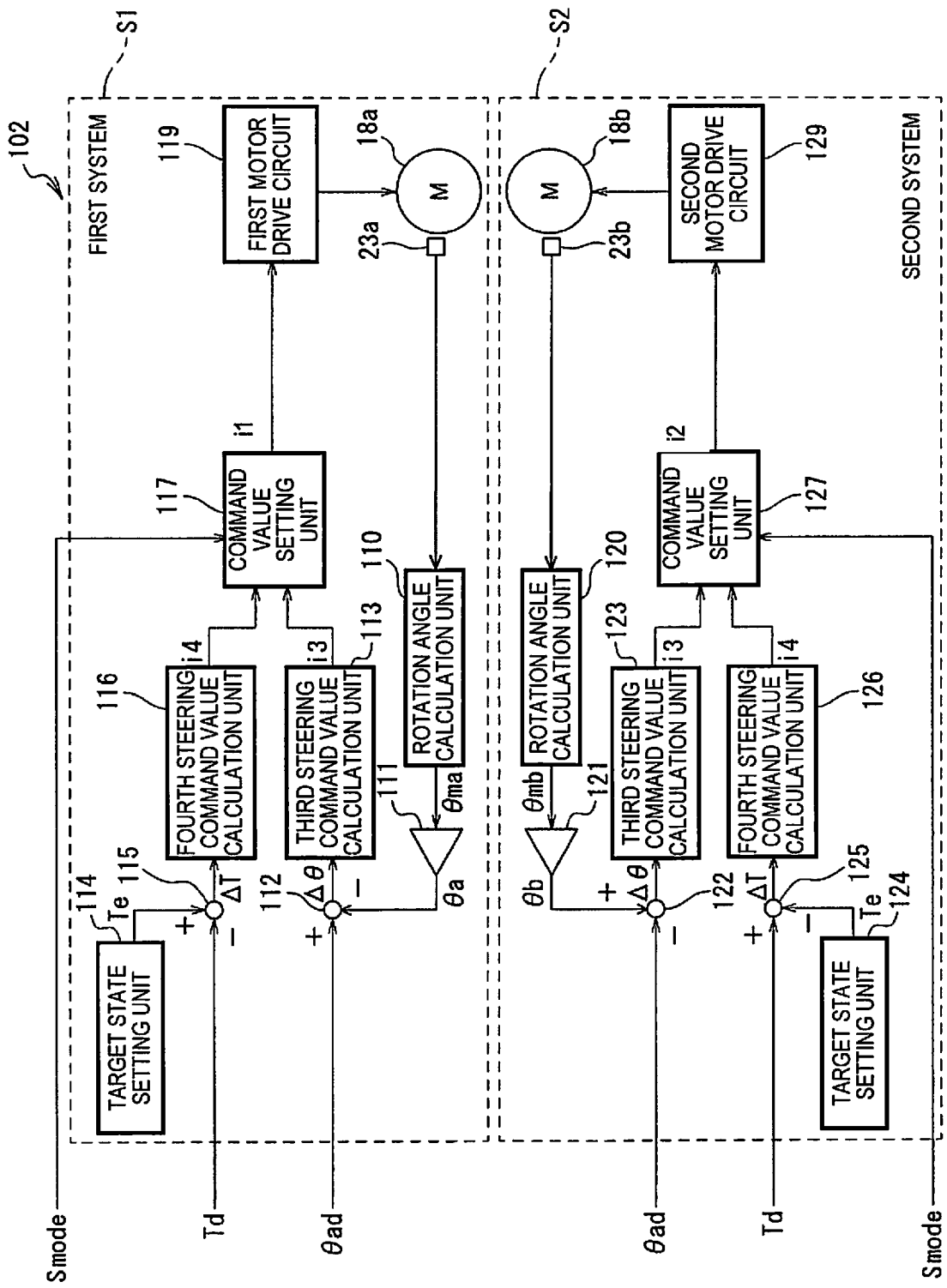
FIG. 5 shows a flowchart of one example of the functional configuration of the motor control unit according to a second embodiment.

FIG. 5 shows a block diagram of one example of the functional configuration of the motor control unit 102 of the second embodiment.

A first system S1 includes a rotation angle calculation unit 110, a reduction ratio division unit 111, a subtractor 112, a third steering command value calculation unit 113, a target state setting unit 114, a subtractor 115, a fourth steering command value calculation unit 116, a command value setting unit 117, a first motor drive circuit 119, a first electric motor 18a, and a rotation angle sensor 23a.

A second system S2 has the same configuration as the first system S1, and includes a rotation angle calculation unit 120, a reduction ratio division unit 121, a subtractor 122, a third steering command value calculation unit 123, a target state setting unit 124, a subtractor 125, a fourth steering command value calculation unit 126, a command value setting unit 127, a second motor drive circuit 129, a second electric motor 18b, and a rotation angle sensor 23b.

The rotation angle calculation unit 110, the reduction ratio division unit 111, the subtractor 112, the third steering command value calculation unit 113, the target state setting unit 114, the subtractor 115, the fourth steering command value calculation unit 116, and the command value setting unit 117 of the second embodiment are respectively identical to the rotation angle calculation unit 110, the reduction ratio division unit 111, the subtractor 112, the third steering command value calculation unit 113, the target state setting unit 114, the subtractor 115, the fourth steering command value calculation unit 116, and the command value setting unit 117 of the first embodiment.

However, the command value setting unit 117 of the second embodiment outputs first steering command value i1 instead of basic steering command value i0. In other words, the command value setting unit 117 sets first steering command value i1 based on third steering command value i3 and fourth steering command value i4.

Therefore, the third steering command value calculation unit 113, the fourth steering command value calculation unit 116, and the command value setting unit 117 are modified so as to calculate first steering command value i1, which corresponds to the torque generated by the first electric motor 18a (for example, 50% of total torque) out of the torque sufficient to cover the entire driving power to be applied to the steering mechanism 4.

Further, the rotation angle calculation unit 120, the reduction ratio division unit 121, the subtractor 122, the third steering command value calculation unit 123, the target state setting unit 124, the subtractor 125, the fourth steering command value calculation unit 126, and the command value setting unit 127 of the second system S2 are respectively identical to the rotation angle calculation unit 110, the reduction ratio division unit 111, the subtractor 112, the third steering command value calculation unit 113, the target state setting unit 114, the subtractor 115, the fourth steering command value calculation unit 116, and the command value setting unit 117 of the first system S1.

However, the rotation angle calculation unit 120 of the second system S2 calculates rotor rotation angle θmb of the second electric motor 18b based on a signal output from the rotation angle sensor 23b. The reduction ratio division unit 121 divides rotor rotation angle θmb by reduction ratio N, thereby converting rotor rotation angle θmb into actual steering angle θb. The subtractor 122 calculates a steering angle deviation Δθ=(θad−θb) of actual steering angle θb from target steering angle θad. In addition, the command value setting unit 127 sets second steering command value i2 based on third steering command value i3 and fourth steering command value i4. As a result, third steering command value i3 and fourth steering command value i4 used for setting first steering command value i1 are calculated by the third steering command value calculation unit 113 and the fourth steering command value calculation unit 116 of the first system S1. On the other hand, third steering command value i3 and fourth steering command value i4 used for setting second steering command value i2 are calculated by the third steering command value calculation unit 123 and the fourth steering command value calculation unit 126 of the second system S2.

In a configuration in which the first and second systems S1 and S2 independently calculate first steering command value i1 and second steering command value i2, respectively, since the time when the target steering angle θad and the actual steering torque Td signals are input to the first system S1 and the time when these signals are input to the second system S2 differ, the first and second steering command values i1 and i2 are provided with a relative time difference and can be output.

For example, the motor control unit 102 may be realized by two electronic control units comprising the control unit of the first system S1 and the control unit of the second system S2. It is also possible that the control unit of the first system S1 may then receive the signals of the target steering angle θad, the control mode signal S mode, and the actual steering torque Td from the upper-level control unit 101 and the torque sensor 12, and the control unit of the second system S2 may receive these signals from the control unit of the first system S1. Thus, a time difference between the time when the target steering angle θad and the actual steering torque Td signals are input to the first system S1 and the time when these signals are input to the second system S2 can be provided. In this case, target steering angle θad, control mode signal S mode, and actual steering torque Td that are input to the control unit of the first system S1 are the same, and only the input time is different.

Figure 6:
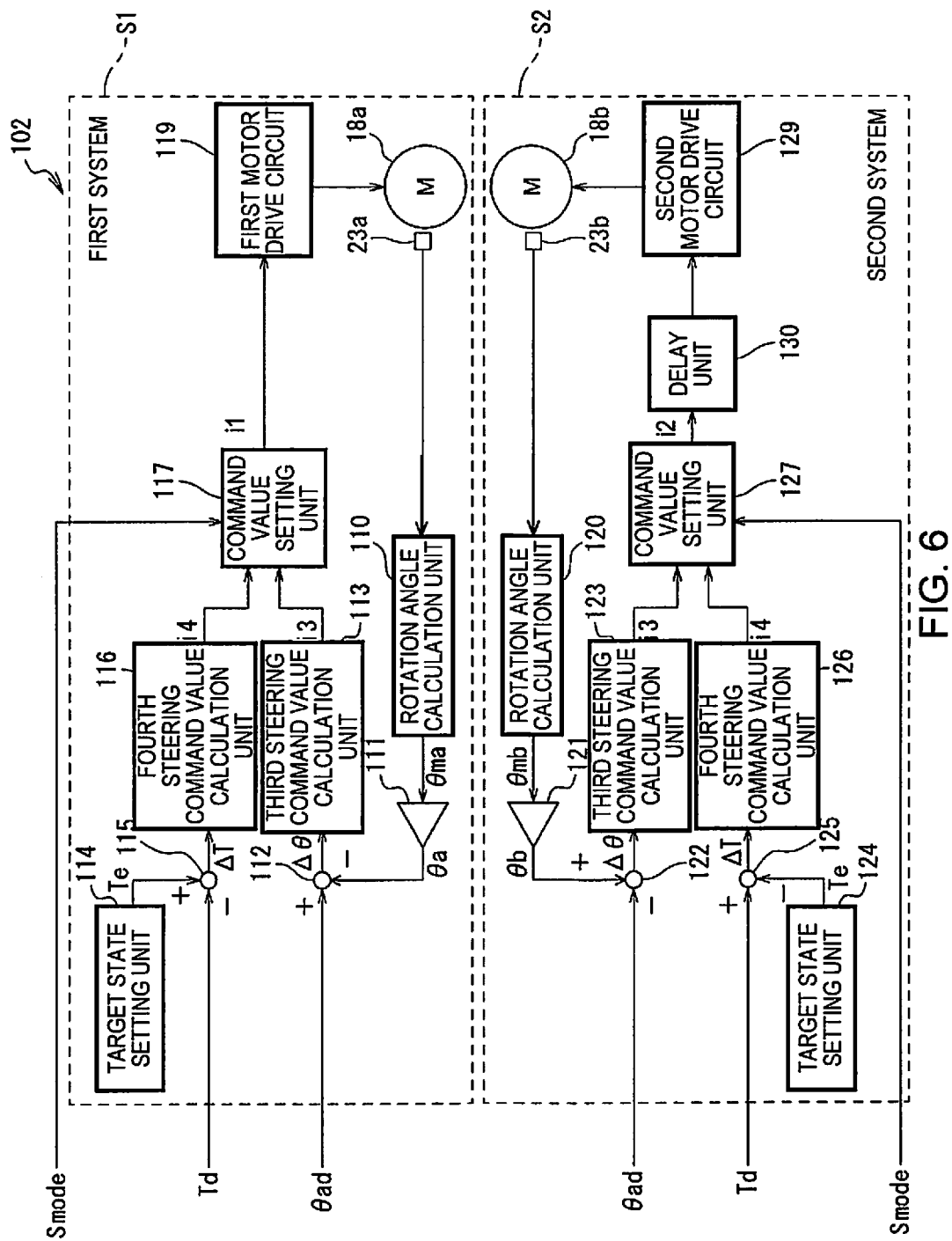
FIG. 6 shows a block diagram of one example of the functional configuration of a variant motor control unit according to the second embodiment.

FIG. 6 shows a block diagram of one example of the functional configuration of a variant of the motor control unit 102 according to the second embodiment. A time difference may be set between first steering command value i1 and second steering command value i2 by providing a delay unit downstream of the command value setting unit 117 of the first system S1 or the command value setting unit 127 of the second system S2. In the example in FIG. 6, a delay unit 130 is provided downstream of the command value setting unit 127 to delay the second steering command value i2. The delay time due to the delay unit 130 may be a fixed value or a variable value that depends on the oscillation frequency of second steering command value i2 (i.e., the rate of change of second steering command value i2). For example, it may be set so that the higher the frequency (the faster the rate of change), the shorter the time delay.

Effect of Embodiment (1) The torque sensor 12, the rotation angle sensor 23a, and the motor control unit 102 detect the current state, which is the current state of the vehicle. The motor control unit 102 sets a target state, which is the target state of the vehicle, calculates first and second steering command values, which are provided with a relative time difference, as steering command values for driving the steering mechanism 4 that steers the steered wheels 3 of the vehicle based on the difference between the current state and the target state, drives the first electric motor 18a which drives the steering mechanism 4 based on the first steering command value, and drives the second electric motor 18b which drives the steering mechanism 4 based on the second steering command value. In this way, the oscillations produced by the transient response of the first steering command value and the second steering command value can be attenuated, thereby suppressing the oscillations produced in the first electric motor 18a and second electric motors 18b.

(2) The current state may be the current steering angle of the host vehicle, and the target state may be a target steering angle set as a target value of the steering angle of the host vehicle. Therefore, the first electric motor 18a and the second electric motor 18b can be driven so that the actual steering angle of the host vehicle becomes the target steering angle.

(3) A target travel trajectory may be set as the path over which the host vehicle is made to travel, and the steering angle for travel along the target trajectory may be calculated as the target steering angle. Therefore, the first electric motor 18a and the second electric motor 18b can be driven so that the host vehicle can travel along the target trajectory.

(4) A target steering angle may be calculated as a steering angle for avoiding obstacles in the travel direction of the host vehicle or to prevent the host vehicle from deviating from the driving lane. Thus, the first electric motor 18a and second electric motors 18b can be driven so that the host vehicle avoids obstacles in the travel direction or so that the host vehicle does not deviate from the driving lane.

(5) The current steering angle, which is the current steering angle of the host vehicle, and the current steering torque, which is the current steering torque of the host vehicle, may be detected as the current state. The motor control unit 102 sets the target steering angle, which is the target value of the steering angle of the host vehicle, and the target steering torque, which is the target value of the steering torque of the host vehicle, as target states, and the first steering command value and the second steering command value may be calculated based on either the difference between the current steering angle and the target steering angle or the difference between the current steering torque and the target steering torque. Therefore, the first electric motor 18a and the second electric motor 18b can be driven based on either the difference between the current steering angle and the target steering angle or the difference between the current steering torque and the target steering torque in accordance with the control mode of the electric power steering system that applied to the steering device.

(6) The current steering angle, which is the current steering angle of the host vehicle, and the current steering torque, which is the current steering torque of the host vehicle, may be detected as the current state. The target steering angle, which is the target value of the steering angle of the host vehicle, and the target steering torque, which is the target value of the steering torque of the host vehicle, may be set as the target state; the third steering command value may be calculated based on the difference between the current steering angle and the target steering angle; the fourth steering command value may be calculated based on the difference between the current steering torque and the target steering torque; and the first steering command value and the second steering command value may be calculated based on the sum of the third steering command value and the fourth steering command value. Therefore, the first electric motor 18*a* and the second electric motor 18*b* can be driven so that the difference between the current steering angle and the target steering angle and the difference between the current steering torque and the target steering torque are reduced.

(7) The time difference between the first steering command value and the second steering command value may be set to be greater than zero and less than one-fourth of the period of the highest oscillation frequency that is thought to occur in a transient response to a change in the steering command value. Therefore, a time difference suitable for the oscillation frequencies of the first steering command value and the second steering command value can be provided.

(8) The motor control unit 102 sets the basic steering command value based on the difference between the current state and the target state, and distributes the basic steering command value between the first steering command value and the second steering command value in a predetermined ratio. Therefore, the first electric motor 18*a* and the second electric motor 18*b* can generate enough torque to cover the entire driving power to be applied to the steering mechanism 4.

(9) The motor control unit 102 calculates the first steering command value based on the difference between the current state and the target state, and calculates the second steering command value based on the difference between the current state and the target state separately from the calculation of the first steering command value. Therefore, a time difference can thus be provided to the first and second steering command values by inputting the signal to be input to the electronic circuit calculating the first steering command value and the signal to be input to the electronic circuit calculating the second steering command value at different times.

All examples and conditional terms described herein are provided in an educational manner to assist the reader in understanding the invention and concepts presented by the inventor for the advancement of the technology, and the foregoing examples and conditions specifically described should be construed without limitation to the constitution of the examples herein with respect to demonstrating the advantages and disadvantages of the present invention. Embodiments of the present invention were explained in detail, but it should be understood that various changes, substitutions, and modifications can be made to these examples without deviating from the essence and scope of the present invention.

The invention claimed is:

1. A steering control method comprising:
   detecting a current state that is the current state of a vehicle;
   setting a target state that is the target state of the vehicle;
   setting a basic steering command value based on a difference between the current state and the target state;
   calculating a first steering command value and a second steering command value having a relative time difference between them as steering command values for driving a steering mechanism for steering steered wheels of the vehicle by distributing the basic steering command value between the first steering command value and the second steering command value in a prescribed ratio; and
   driving a first steering motor that drives the steering mechanism based on the first steering command value, and a second steering motor that drives the steering mechanism based on the second steering command value.

2. The steering control method according to claim 1, wherein
   the current state is a current steering angle of the vehicle and the target state is a target steering angle set as a target value of the steering angle of the vehicle.

3. The steering control method according to claim 2, further comprising
   setting a target trajectory as a trajectory along which the vehicle is made to travel, and calculating a steering angle with which the vehicle is made to travel along the target trajectory as the target steering angle.

4. The steering control method according to claim 2, wherein
   the target steering angle is calculated as a steering angle for avoiding obstacles in a direction of travel of the vehicle or as a steering angle for preventing the vehicle from deviating from a travel lane.

5. The steering control method according to claim 1, wherein
   a current steering angle that is the current steering angle of the vehicle, and a current steering torque that is a current steering torque of the vehicle are detected as the current state,
   a target steering angle that is a target value of the steering angle of the vehicle and a target steering torque that is a target value of the steering torque of the vehicle are set as the target state, and
   the first steering command value and the second steering command value are calculated based on either a difference between the current steering angle and the target steering angle or a difference between the current steering torque and the target steering torque.

6. The steering control method according to claim 1, wherein
   a current steering angle that is the current steering angle of the vehicle and a current steering torque that is the current steering torque of the vehicle are detected as the current state,
   a target steering angle that is a target value of the steering angle of the vehicle and the target steering torque that is the target value of the steering torque of the vehicle are set as the target state,
   a third steering command value is calculated based on a difference between the current steering angle and the target steering angle,
   a fourth steering command value is calculated based on a difference between the current steering torque and the target steering torque, and
   the first steering command value and the second steering command value are calculated based on a sum of the third steering command value and the fourth steering command value.

7. The steering control method according to claim 1, wherein
   a time difference is set to be greater than 0 and less than one-fourth of a period of a highest oscillation frequency that is considered to occur in a transient response to a change in the steering command value.

8. The steering control method according to claim 1, wherein
the first steering command value is calculated based on the difference between the current state and the target state, and
the second steering command value is calculated based on the difference between the current state and the target state separately from calculation of the first steering command value.

9. A steering device comprising:
a first steering motor and a second steering motor configured to drive a steering mechanism for steering steered wheels of a vehicle; and
a controller configured to obtain a current state detected as the current state of the vehicle, set a target state as the target state of the vehicle, set a basic steering command value based on a difference between the current state and the target state, calculate a first steering command value and a second steering command value having a relative time difference between them as steering wheel rotation command values for driving the steering mechanism of the vehicle by distributing the basic steering command value between the first steering command value and the second steering command value in a prescribed ratio, drive the first steering motor based on the first steering command value, and drive the second steering motor based on the second steering command value.

* * * * *